M. G. CHANDLER.
ENGINE TRUNK PISTON.
APPLICATION FILED APR. 30, 1914.
1,114,229.
Patented Oct. 20, 1914.
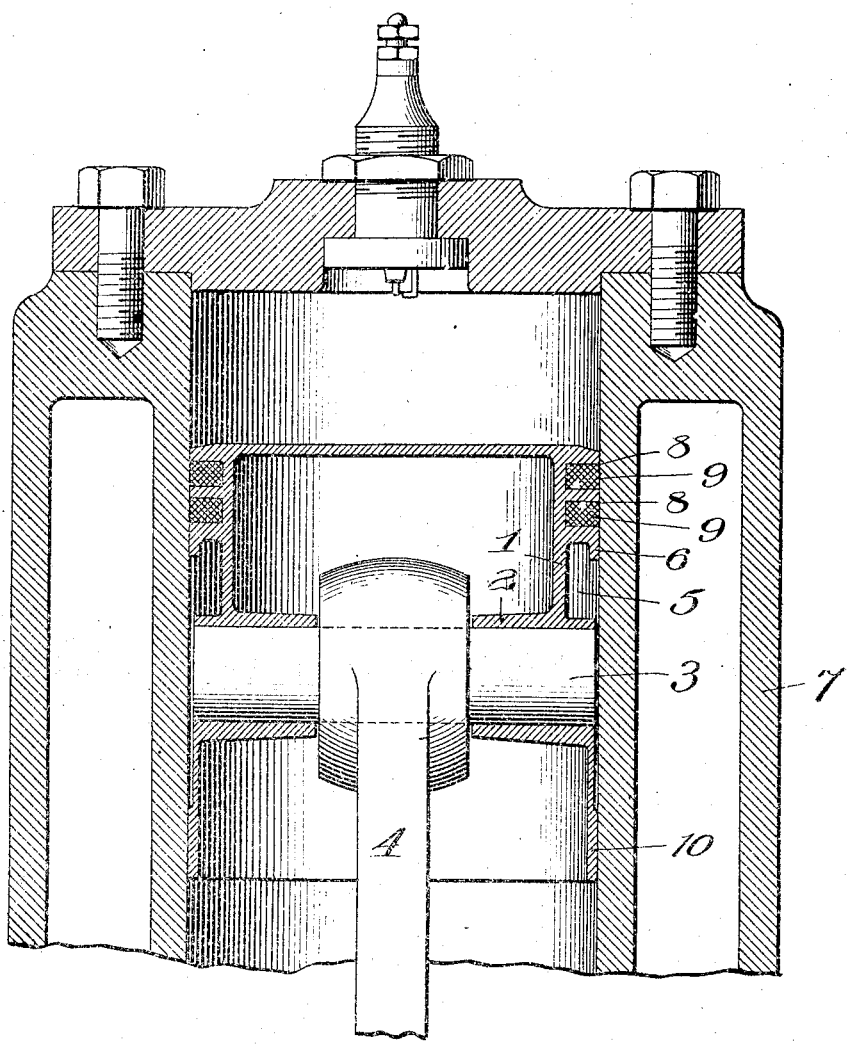

UNITED STATES PATENT OFFICE.

MILFORD G. CHANDLER, OF CHICAGO, ILLINOIS.

ENGINE TRUNK-PISTON.

1,114,229.

Specification of Letters Patent. Patented Oct. 20, 1914.

Application filed April 30, 1914. Serial No. 835,426.

*To all whom it may concern:*

Be it known that I, MILFORD G. CHANDLER, a citizen of the United States, residing at Chicago, in the county of Cook and State of Illinois, have invented a new and useful Improvement in Engine Trunk-Pistons, of which the following is a specification.

It is a matter of great importance, especially in high-speed internal combustion engines, that the trunk-pistons be as light in weight as possible, consistent with the requisite strength and freedom from distortion on the power-stroke. The bearings in the pistons for the rods connecting the piston-rods to the pistons are required to be relatively long, as compared with the thickness of the piston-wall, and therefore it is common practice to provide opposed bosses on the pistons in which the pins are journaled. As pistons have hitherto been constructed when of relatively light-weight construction, the leverage exerted on the power-stroke by the pin, intermediate its ends, on the wall of the piston above the bosses, causes that portion of the piston above the bosses, which bears against the cylinder, to be distorted and bear with such pressure against the cylinder that scoring of the cylinder often results.

My object is to provide a piston which shall be as light, if not lighter, in weight than those hitherto constructed, and in which flexing, or springing, of the pin-bosses will be reduced to the minimum, and in case springing does occur, the bearing surfaces of the piston will not be distorted, and thus scoring of the cylinder will be avoided.

A further object is to provide a piston of such construction that its inner surface may be readily machined.

Referring to the accompanying drawing, wherein my improved piston is shown as used in an internal combustion engine, the view therein shown is in vertical sectional elevation through the cylinder and piston, the piston-rod and pin for connecting the latter with the piston being shown in elevation.

In carrying out my invention, the wall 1, directly above the bosses 2 for the pin 3 which connects the piston with the piston-rod 4, is annularly recessed on the outer surface of the piston, as indicated at 5, to render this wall relatively thin, in practice, where a piston of three and one-fourth inches in diameter is used, this wall being preferably about three thirty-seconds of an inch thick, whereby this wall, when the piston is constructed from the metal usually employed in piston-constructions, is rendered inherently springy to a slight degree.

By recessing the piston, as described, the lower end of the wall 1 is inset relative to the entire outer ends of the bearings for the pin 3, and thus joins with these bearings intermediate the ends of, and wholly above, the latter, as represented, thereby preserving full length bearings for the pin 3. Furthermore, by insetting the wall 1, relative to the outer ends of the bearings, the resistance afforded by the wall of the piston above the bearings, to the flexing, or springing, of the bearings under the power-stroke, is greatly augmented, as compared with a structure wherein the wall of the piston, above the bearings, connects therewith at the outer ends of the latter.

The recess 5 terminates at its upper side preferably at an annular bearing-portion 6 of the piston adapted to slidingly engage the inner surface of the cylinder, represented at 7, this recess preferably extending up into the portion of the piston forming the bearing-portion 6, whereby, while preserving a desirable width of the bearing surface, serves to aid in reducing the weight of the piston. Above the bearing-surface 6, one or more piston-ring-receiving grooves 8 are provided for receiving piston-rings 9, two of such grooves being shown in the construction illustrated. The piston is preferably of slightly reduced diameter between the bearing-surface 6 and an annular bearing-surface 10 located below the bearings for the pin 3 and preferably at the lower end of the piston.

The provision of the relatively thin and springy wall 1, above the bearings for the pin 3, is a very desirable feature of my improved piston, as the piston may be made relatively light at this portion of the latter, and should the resistance afforded by the piston-rod 4, in the operation of the engine of which the piston is a part, to the movement of the piston, be sufficiently great to cause the bearings for the pin 3 to spring on the power-stroke, the wall 1, by reason of its springiness, will distort, but the bearing-portion 6 of the piston will not distort, but will maintain its true circular form, preventing scoring of the cylinder. Thus by providing a piston with either of the features above stated, namely that of insetting the wall immediately above the bearings for the pin 3, and preserving full length bearing for the latter, and forming this wall relatively thin and of springy metal, and especially by incorporating both of these features in a piston, it may be made of very light weight and danger of scoring the cylinder be avoided.

What I claim as new and desire to secure by Letters Patent is—

A trunk-piston with diametrically-opposed bosses forming bearings for the piston-rod pin, the wall of the piston above said bosses and connected with the latter being single and integral with the closed end of the piston, packing-ring grooves in said wall, the portion of said wall between the lowermost of said grooves and said bosses being inset relative to the outer ends of said bosses and the groove-equipped portion of said wall and relatively thin and springy, with the outer ends of said bearings extending throughout their circumferences wholly beyond said inset portion of the wall, and the outer ends of said bosses merging into the circular piston wall.

MILFORD G. CHANDLER.

In presence of—
D. C. THORSEN,
O. C. AVISUS.